United States Patent
Yoon

(10) Patent No.: US 8,310,582 B2
(45) Date of Patent: Nov. 13, 2012

(54) DIGITAL IMAGE PROCESSING APPARATUS AND METHOD FOR DISPLAYING A PLURALITY OF IMAGES

(75) Inventor: Jung-woon Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 12/536,673

(22) Filed: Aug. 6, 2009

(65) Prior Publication Data

US 2010/0045822 A1 Feb. 25, 2010

(30) Foreign Application Priority Data

Aug. 19, 2008 (KR) ........................ 10-2008-0081065

(51) Int. Cl.
*H04N 5/222* (2006.01)
*G06F 3/048* (2006.01)
*G09G 5/00* (2006.01)

(52) U.S. Cl. .................... 348/333.05; 715/801; 715/788; 345/635

(58) Field of Classification Search ............. 348/333.05, 348/333.11, 333.12, 240.2; 715/801, 800, 715/798, 788, 732, 761; 345/635
See application file for complete search history.

(56) References Cited

U.S. PATENT DOCUMENTS

| | | | | |
|---|---|---|---|---|
| 6,674,472 B1 * | 1/2004 | Tsutsui | ..................... | 348/333.05 |
| 7,339,622 B2 * | 3/2008 | Yokokawa | ................ | 348/333.01 |
| 7,515,192 B2 * | 4/2009 | Sekiguchi | ................ | 348/333.05 |
| 7,639,300 B2 * | 12/2009 | Yumiki | ..................... | 348/333.12 |
| 7,646,416 B2 * | 1/2010 | Takaiwa et al. | ........... | 348/333.05 |
| 7,961,242 B2 * | 6/2011 | Yumiki | ..................... | 348/333.12 |
| 8,013,925 B2 * | 9/2011 | Ito | ............................. | 348/333.05 |
| 2001/0015762 A1 * | 8/2001 | Suzuki et al. | ............. | 348/333.05 |
| 2004/0046886 A1 * | 3/2004 | Ambiru et al. | ........... | 348/333.12 |
| 2005/0190280 A1 * | 9/2005 | Haas et al. | ............... | 348/333.05 |
| 2006/0103753 A1 * | 5/2006 | Lee | ............................ | 348/333.11 |
| 2007/0188646 A1 * | 8/2007 | Kobayashi et al. | ...... | 348/333.11 |
| 2008/0052945 A1 * | 3/2008 | Matas et al. | ..................... | 34/173 |
| 2008/0129759 A1 * | 6/2008 | Jeon et al. | ...................... | 345/667 |
| 2009/0037605 A1 * | 2/2009 | Li | ................................. | 709/246 |
| 2010/0056221 A1 * | 3/2010 | Park | ............................... | 455/566 |
| 2010/0192099 A1 * | 7/2010 | Takagi | ........................... | 715/828 |
| 2010/0245651 A1 * | 9/2010 | Minamino | ............... | 348/333.05 |
| 2010/0289825 A1 * | 11/2010 | Shin et al. | ..................... | 345/667 |
| 2010/0302281 A1 * | 12/2010 | Kim | .............................. | 345/661 |
| 2011/0043651 A1 * | 2/2011 | Nonaka et al. | ............. | 348/220.1 |
| 2011/0074824 A1 * | 3/2011 | Srinivasan et al. | ............ | 345/660 |
| 2011/0246947 A1 * | 10/2011 | Hirohata et al. | .............. | 715/838 |
| 2011/0310264 A1 * | 12/2011 | Kim | ............................ | 348/222.1 |

FOREIGN PATENT DOCUMENTS

DE 102008054113 A1 * 5/2010
(Continued)

*Primary Examiner* — John Villecco
(74) *Attorney, Agent, or Firm* — Drinker Biddle & Reath LLP

(57) ABSTRACT

A digital image processing apparatus may include a storage medium which stores image files and a display which displays images corresponding to the image files stored on the storage medium. A display region of the display may be divided into a plurality of regions and a plurality of images corresponding to a plurality of image files stored on the storage medium may be respectively displayed in the plurality of regions. The plurality of images may be displayed simultaneously and a size of at least one of the plurality regions may be variable.

21 Claims, 6 Drawing Sheets

FOREIGN PATENT DOCUMENTS

| | | | | |
|---|---|---|---|---|
| JP | 2005275034 | A | * | 10/2005 |
| JP | 2006166146 | A | * | 6/2006 |
| JP | 2008028936 | A | * | 2/2008 |
| JP | 2008131377 | A | * | 6/2008 |
| JP | 2009175935 | A | * | 8/2009 |
| JP | 2010124181 | A | * | 6/2010 |

* cited by examiner

DIGITAL IMAGE PROCESSING APPARATUS AND METHOD FOR DISPLAYING A PLURALITY OF IMAGES

CROSS-REFERENCE TO RELATED PATENT APPLICATION

This application claims the priority benefit of Korean Patent Application No. 10-2008-0081065, filed on Aug. 19, 2008, in the Korean Intellectual Property Office, the disclosure of which is incorporated herein in its entirety by reference.

BACKGROUND

1. Field of the Invention

The present invention relates to a digital image processing apparatus, and more particularly, to a digital image processing apparatus and method for displaying a plurality of images on a display.

2. Description of the Related Art

Typically, digital image processing apparatuses reproduce image files from a storage medium to obtain images from image data in order to display the images on displays. A digital photographing apparatus is a kind of digital image processing apparatus that photographs a subject in a photographing mode, stores image data in a storage medium, reproduces an image file from the storage medium, and displays an image obtained from the image data on a display.

Such a conventional digital image processing apparatus displays an image or a plurality of images on a display. However, when the conventional digital image processing apparatus displays the plurality of images, a user cannot effectively compare the plurality of images.

SUMMARY

A digital image processing apparatus may include a storage medium which stores image files and a display which displays images corresponding to the image files stored on the storage medium. A display region of the display may be divided into a plurality of regions and a plurality of images corresponding to a plurality of image files stored on the storage medium may be respectively displayed in the plurality of regions such that the plurality of images are displayed simultaneously and a size of at least one of the plurality regions may be variable.

The display may include a touch screen having a touch screen function. A size of at least one of the plurality of regions of the display may be variable in response to a touch point dragged on the touch screen.

When the plurality of images are displayed on the display, another image corresponding to another image file stored on the storage medium may be displayed in one of the plurality of regions according to a signal input from a user.

When the plurality of images are displayed on the display, another image corresponding to another image file stored on the storage medium may be displayed in one of the plurality of regions according to a touch of the user on the touch screen at a point corresponding to the one of the plurality of regions of the display.

When the another image corresponding to another image file stored on the storage medium is displayed in the one of the plurality of regions, the another image file may be out of sequence with the plurality of image files corresponding to the plurality of images.

When the plurality of images are displayed on the display, an image displayed in one of the plurality of regions of the display may be displayed throughout the display region of the display according to a signal input from a user.

The display may include a touch screen having a touch screen function and when the plurality of images are displayed on the display, an image displayed in one of the plurality of regions of the display corresponding to a point at which a user inputs a touch on the touch screen may be displayed throughout the display region of the display.

When the plurality of images are displayed on the display and consecutive touches of a user are input at a point on the touch screen, an image displayed in one of the plurality of regions to which the touch point corresponds may be displayed throughout the display region of the display.

A digital image processing apparatus may include a storage medium which stores image files and a display which displays images corresponding to the image files stored on the storage medium. The display region of the display may be divided into a plurality of regions and a plurality of images corresponding to a plurality of image files stored on the storage medium may be respectively displayed in the plurality of regions such that the plurality of images are displayed simultaneously on the display, and another image corresponding to another image file stored on the storage medium may be displayed in one of the plurality of regions of the display according to a signal input from a user.

The display may include a touch screen having a touch screen function, and the signal input from the user may include a touch of the user at a point of the touch screen corresponding to the one of the plurality of regions of the display.

When the another image corresponding to another image file stored on the storage medium is displayed in the one of the plurality of regions, the another image file may be out of sequence with the plurality of image files corresponding to the plurality of images.

A digital image processing apparatus may include a storage medium which stores image files and a display which displays images corresponding to the image files stored on the storage medium. The display may include a touch screen having a touch screen function. A display region of the display may be divided into a plurality of regions and a plurality of images corresponding to a plurality of image files stored on the storage medium may be respectively displayed in the plurality of regions such that the plurality of images are displayed simultaneously. An image displayed in one of the plurality of regions corresponding to a point at which a user inputs a touch on the touch screen may be displayed throughout the display region of the display.

When the plurality of images are displayed on the display and consecutive touches are input from a user at a point, an image displayed in one of the plurality of regions of the display to which the touch point corresponds may be displayed throughout the display region of the display.

A method for displaying a plurality of images on a digital image processing apparatus may include displaying an image corresponding to an image file stored on a storage medium throughout a display region of a display, dividing the display region of the display into a plurality of regions, and displaying a plurality of images corresponding to a plurality of image files stored on the storage medium in the plurality of regions respectively. The method may further include varying a size of at least one of the plurality of regions.

Varying the size of the at least one of the plurality of regions may include interpreting a touch input from a user on a touch screen of the display.

Varying the size of the at least one of the plurality of regions may be in proportion to a drag of a touch point input from a user on a touch screen of the display.

The method may further include displaying another image corresponding to another image file stored on the storage medium in one of the plurality of regions according to a signal input from a user.

The another image file may be out of sequence with the plurality of image files corresponding to the plurality of images.

The method may further include displaying one of the plurality of images displayed in the plurality of regions throughout the display region of the display according to a signal input from a user.

The input from the user may include consecutive touches input from the user on a touch screen of the display at touch points which correspond to the one of the plurality of images.

DETAILED DESCRIPTION

Figure 1:
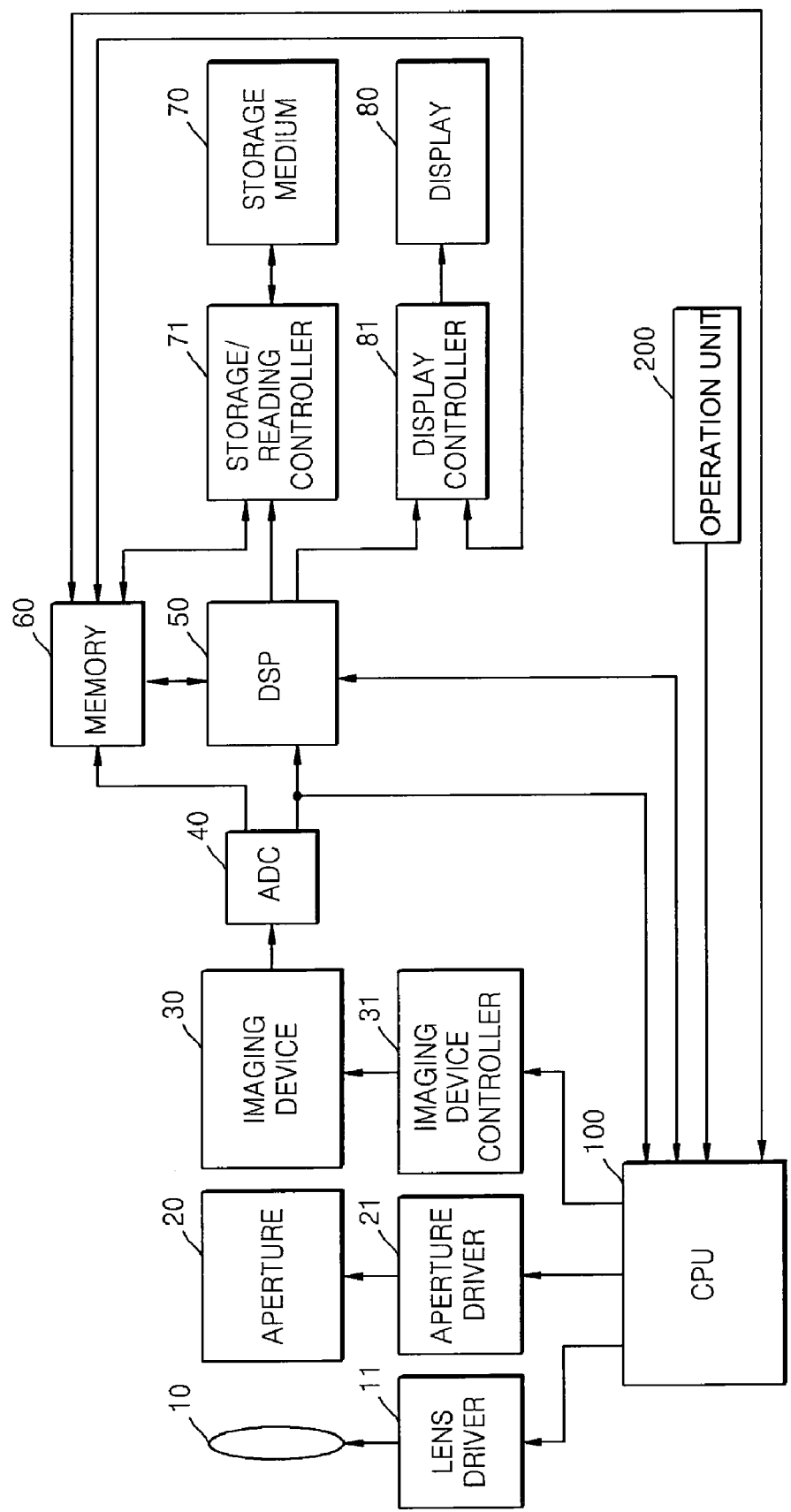
FIG. 1 is a schematic block diagram of an exemplary digital image photographing apparatus as a digital image processing apparatus.

FIG. 1 is a schematic block diagram of an exemplary digital image photographing apparatus as a digital image processing apparatus. A central processing unit (CPU) 100 may control an overall operation of the digital image photographing apparatus. The digital image photographing apparatus may include an operation unit 200 which may include keys, etc., for generating an electric signal corresponding to input from a user. The operation unit 200 may transmit the electric signal to the CPU 100 in order that the CPU 100 may control the digital image photographing apparatus according to the electric signal.

When the electric signal corresponding to input from the user is transmitted to the CPU 100 in a photographing mode, the CPU 100 may interpret the electric signal to control a lens driver 11, an aperture driver 21, and an imaging device controller 31 in order to control a position of a lens 10, an opened degree of an aperture 20, sensitivity of an imaging device 30, etc. The imaging device 30 may generate data representing an image from input light, and an optional analog-to-digital converter (ADC) 40 may convert analog data output from the imaging device 30 into digital data. The digital image photographing apparatus may not include the ADC 40 depending on characteristics of the imaging device 30.

The data output from the imaging device 30 may be input to a digital signal processor (DSP) 50 through a memory 60, may be input to the DSP 50 without passing through the memory 60, or may be input to the CPU 100. The memory 60 may include a read only memory (ROM), a random access memory (RAM), or the like. The DSP 50 may perform digital signal processing such as gamma correction, white balance control, etc.

Image data output from the DSP 50 may be transmitted to a display controller 81 through the memory 60 or directly transmitted to the display controller 81. The display controller 81 may control a display 80 to display a moving picture image on the display 80. The image data output from the DSP 50 may be input to a storage/reading controller 71 through the memory 60 or directly input to the storage/reading controller 71. The storage/reading controller 71 may store moving picture image data as an image file on a storage medium 70 according to a signal input from the user or automatically. The storage/reading controller 71 may read data representing an image from the image file stored on the storage medium 70 and transmit the image data to the display controller 81 through the memory 60 or another path in order to display an image on the display 80. The storage medium 70 may be removably or permanently installed in the digital image photographing apparatus.

The digital image photographing apparatus has been described as an example of a digital image processing apparatus with reference to FIG. 1. However, this description should not be considered limiting, as embodiments may also include image processing apparatuses such as personal digital assistants (PDAs), personal multimedia players (PMPs), or other embodiments and modifications. Hereinafter, embodiments and modifications will be described based on the digital image photographing apparatus as illustrated with reference to FIG. 1.

Figure 2A:
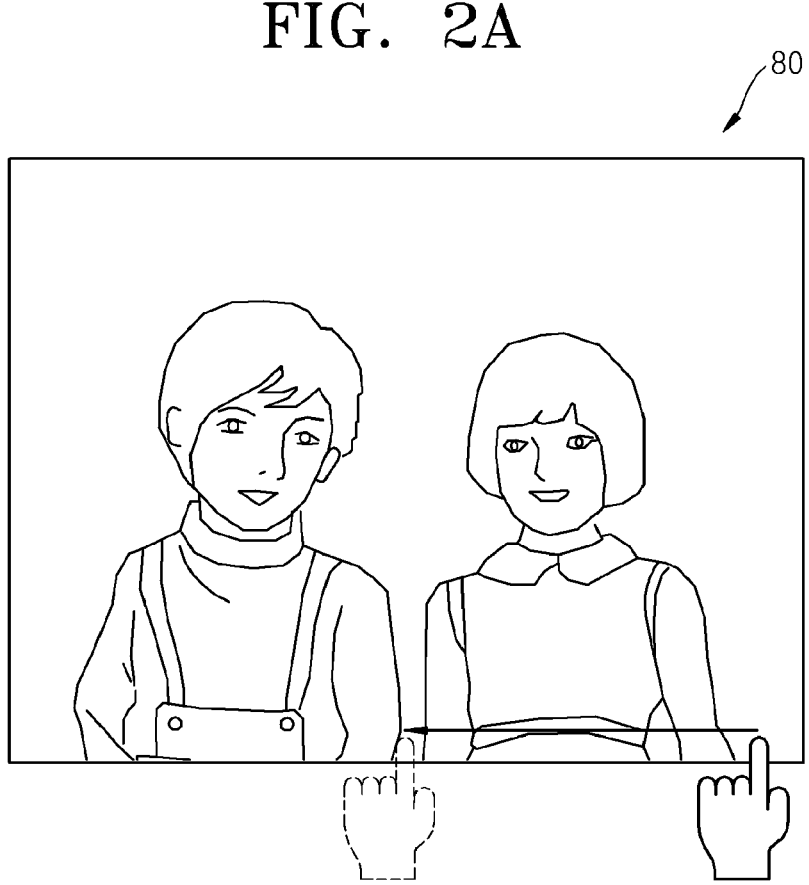
FIGS. 2A through 2C schematically illustrate exemplary images displayed on a display according to an operation of the digital image processing apparatus of FIG. 1.
Figure 2B:
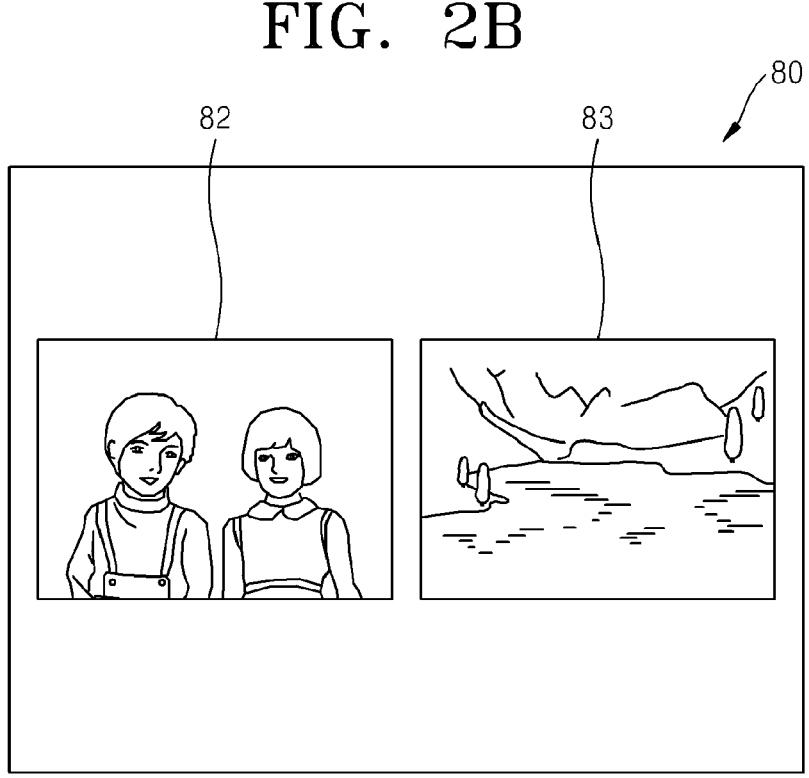
Figure 2C:
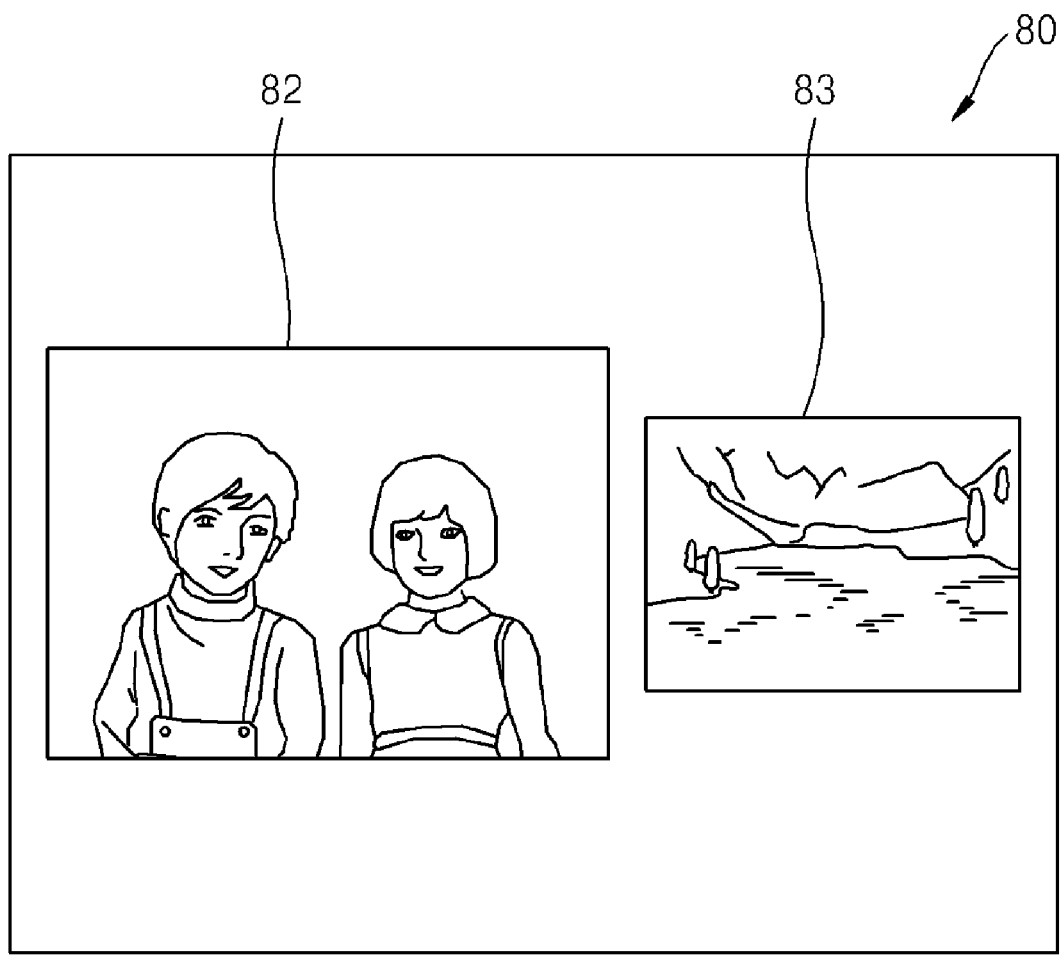

FIGS. 2A through 2C schematically illustrate exemplary images displayed on a display according to an operation of the digital image processing apparatus of FIG. 1. FIG. 2A schematically illustrates a first exemplary image displayed on the display 80, wherein the first image may correspond to a first image file stored on the storage medium 70. As shown in FIG. 2B, the first image may be displayed in a first region 82 of the display 80, and a second image may be displayed in a second region 83 of the display 80, according to a signal input from a user. The first image may correspond to the first image file, and the second image may correspond to a second image file. As illustrated in FIG. 2A, since the first and second regions 82 and 83 of the display 80 have the same size, the first and second images may be displayed at the same size on the display 80. However, as shown in FIG. 2C, the digital image processing apparatus may set the first and second regions 82 and 83 to different sizes in order to display first and second images at different sizes on the display 80. In other words, the digital image processing apparatus may divide a display region of the display 80 into a plurality of regions to respectively display images in the plurality of regions. Thus, the digital image processing apparatus may simultaneously display images corresponding to a plurality of image files stored on the storage medium 70 on the display. However, the digital image processing apparatus may vary a size of at least one of the plurality of regions.

The conventional digital image processing apparatus typically displays a plurality of images at the same size on a display. Thus, when a user uses the conventional digital image processing apparatus to simultaneously display a plurality of images on a display, the user is not able to notice a specific one of the plurality of images in more detail. However, when an embodiment of the digital image processing apparatus as described herein displays a plurality of images on a display, the digital image processing apparatus may vary a size of at least one of the plurality of images. Thus, the digital image processing apparatus can vary the size of a specific image in order to maximize the user's convenience. In particular, the digital image processing apparatus may simultaneously display a plurality of similar images on the display 80. In this case, the digital image processing apparatus may vary sizes of the plurality of similar images in order to allow the user to effectively compare the plurality of similar images. After the display region of the display 80 is divided into the first and second regions 82 and 83 as shown in FIG. 2B, a touch point may be formed by a user touching the display, and then the user may drag the touch point to vary the sizes of the first and second regions 82 and 83. The sizes of the first and second regions 82 and 83 may vary in proportion to the user's dragging of the touch point.

The display 80 may include a touch screen having a touch screen function. The touch screen may include an embodiment of the operation unit 200. Accordingly, the CPU 100 may interpret the user touching the display 80 to control the display 80 using at least the display controller 81. In this case, when the first image is displayed on the display 80 as shown in FIG. 2A, the touch point may be dragged on the display 80 in order to vary regions of the display 80. For example, if the touch point is dragged from a right lower end to a central lower end of the display 80 in the display state of FIG. 2A, the first and second images may be respectively displayed in the first and second regions 82 and 83 into which the display region of the display 80 is divided based on the center of the display 80, as shown in FIG. 2B. If the touch point is dragged from the right lower end to before the central lower end rather than to the central lower end in the display state of FIG. 2A, the first and second images may be respectively displayed in the first and second regions 82 and 83 into which the display region of the display 80 is divided to different sizes, in detail, based on a finally dragged position of the touch point, as shown in FIG. 2C. However, this description is not limiting and may be applied to various modifications.

Figure 3A:
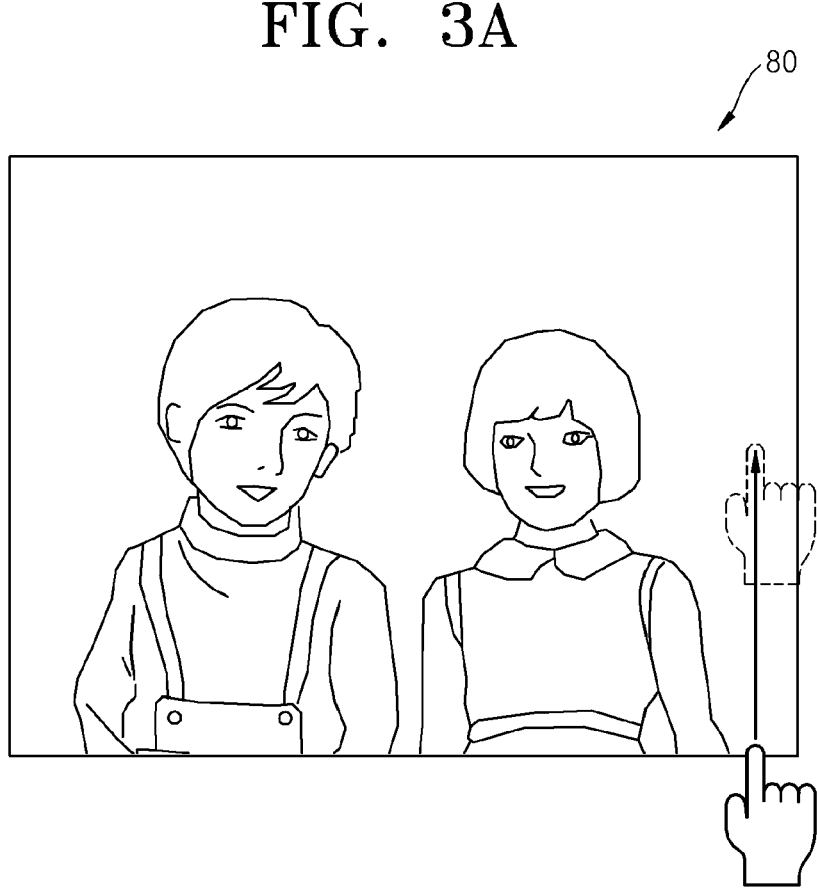
FIGS. 3A and 3B schematically illustrate exemplary images displayed on a display according to another operation of the digital image processing apparatus of FIG. 1.
Figure 3B:

FIGS. 3A and 3B schematically illustrate exemplary images displayed on a display according to another operation of the digital image processing apparatus of FIG. 1. As described with reference to FIGS. 2A through 2C, the touch point may be dragged from the left to the right to divide the display region into left and right regions; however, this description is not limiting. For example, the touch point may be dragged from a lower part to an upper part to divide the display region of the display 80 into upper and lower regions as shown in FIGS. 3A and 3B. For example, if the touch point is dragged from the right lower end to a right central end when the first image is displayed on the display 80 as shown in FIG. 3A, the display region may be divided into the first and second regions 82 and 83 based on the center of the upper and lower parts in order to respectively display the first and second images in the first and second regions 82 and 83 as shown in FIG. 3B.

Figure 4A:
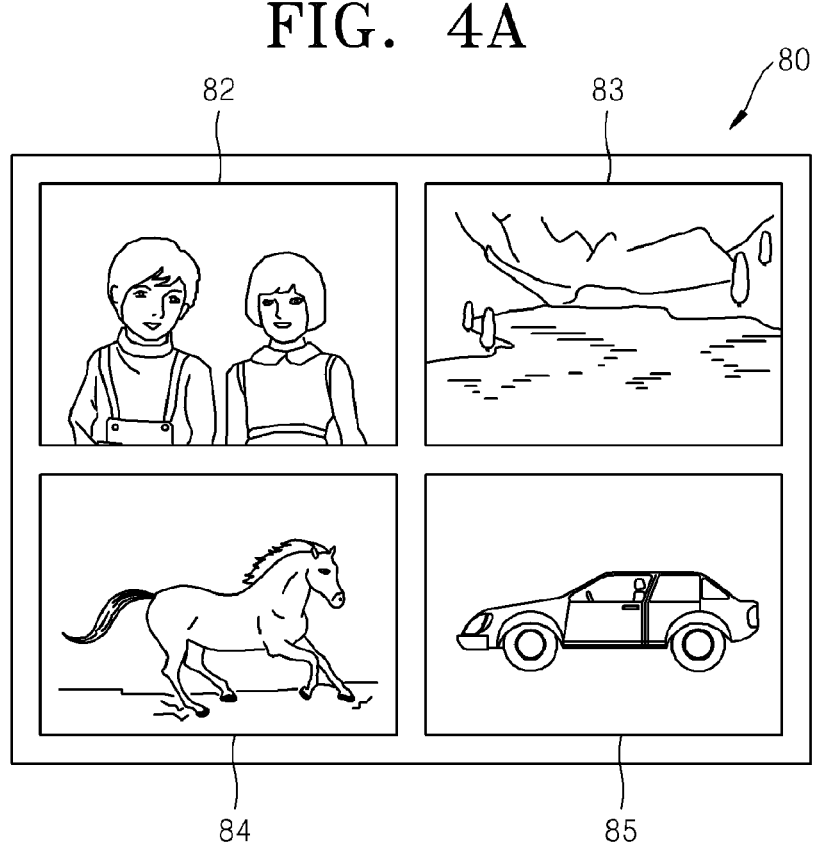
FIGS. 4A through 4C schematically illustrate exemplary images displayed on a display according to yet another operation of the digital image processing apparatus of FIG. 1.
Figure 4B:
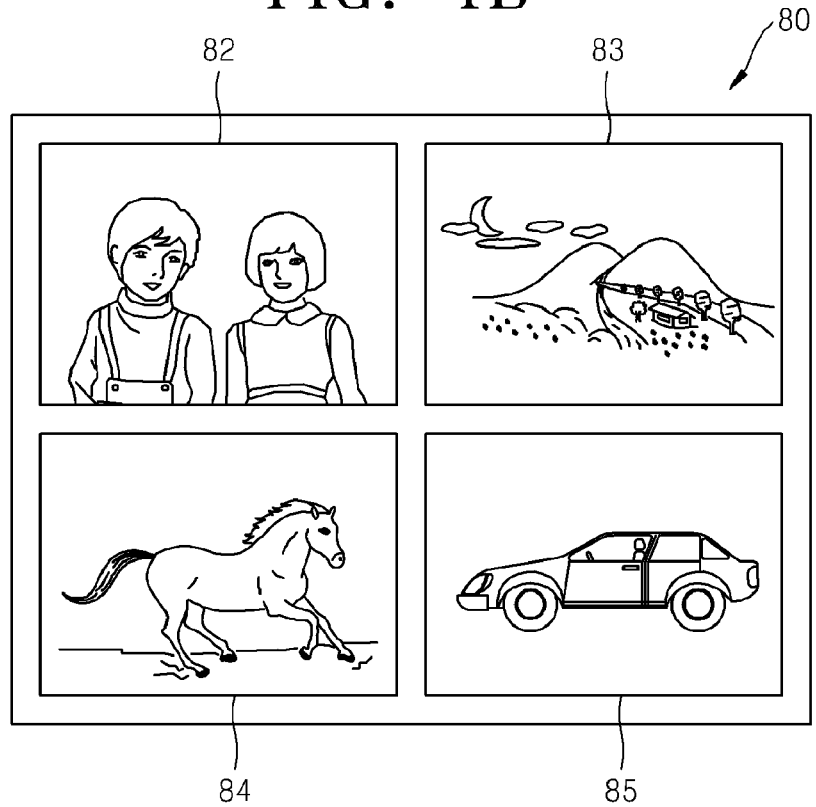
Figure 4C:
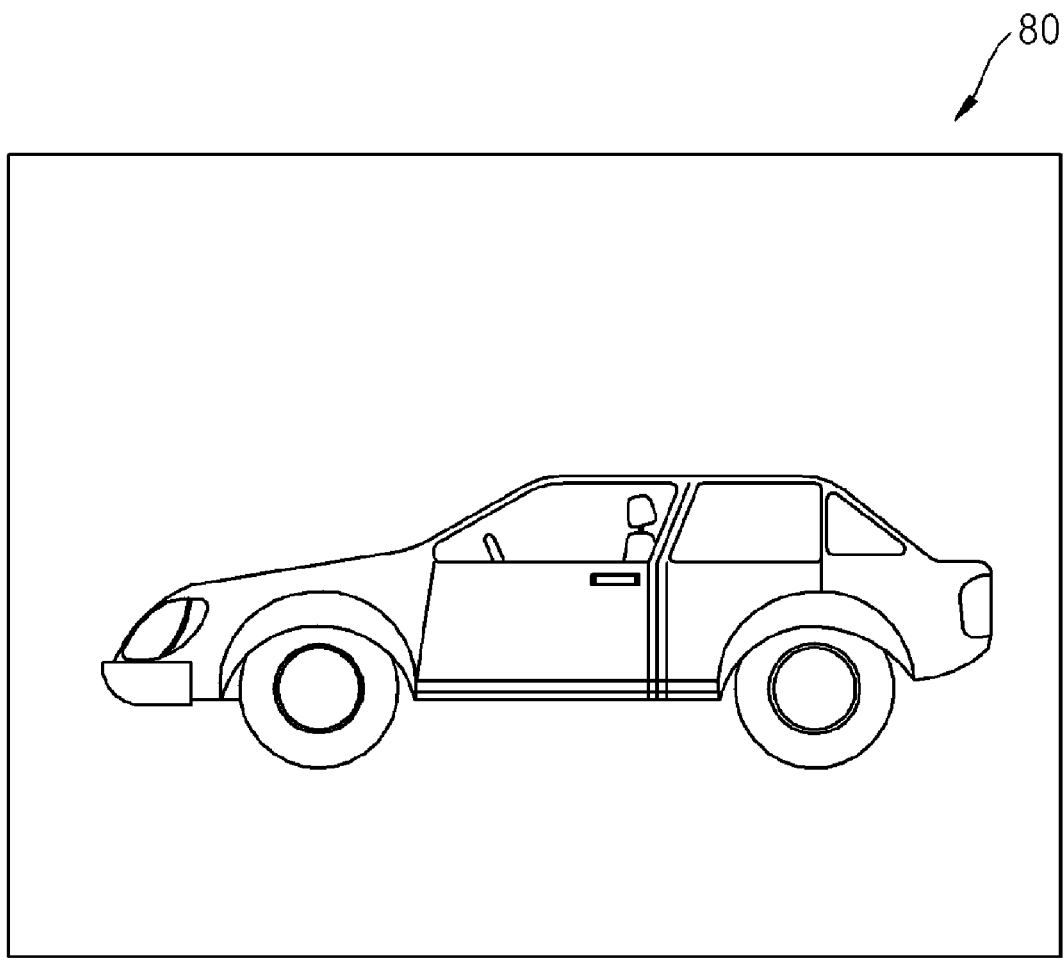

FIGS. 4A through 4C schematically illustrate exemplary images displayed on a display according to another operation of the digital image processing apparatus of FIG. 1. A touch point may be dragged from the left to the right when the first image is displayed on the display 80 as shown in FIG. 2A to divide the display region of the display 80 into the first and second regions 82 and 83 so as to respectively display the first and second images in the first and second regions 82 and 83 as shown in FIG. 2B. Another touch point may be dragged from the lower part to the upper part in this state to divide the display region of the display 80 into first through fourth regions 82 through 85 so as to respectively display first through fourth images in the first through fourth regions 82 through 85 as shown in FIG. 4A. In FIG. 4A, the first through fourth regions 82 through 85 have the same size. However, this is only an example. In other words, a dragged position of the touch point may be adjusted when the display region is divided into the first through fourth regions 82 through 85, in order to vary the size of at least one of the first through fourth regions 82 through 85. The size of at least one of the first through fourth regions 82 through 85 may be variable in proportion to the dragging of the touch point.

After the display region is divided into the first through fourth regions 82 through 85, an adjacent position among the first through fourth regions 82 through 85 may be touched to drag the touch point in order to vary the size of at least one of the first through fourth regions 82 through 85. The adjacent position among the first through fourth regions 82 through 85 refers to a point at which a virtual line for dividing the display region into upper and lower regions intersects with a virtual line for dividing the display region into left and right regions, i.e., the center of the display 80 in the case of FIG. 4A.

When the digital image processing apparatus of the present embodiment displays a plurality of images on the display 80 as shown in FIG. 4A and a signal is input from a user, the digital image processing apparatus may display another image corresponding to another image file stored on a storage medium which is not among the image files corresponding to the images displayed on the display, in one of the first through fourth regions 82 through 85 of the display 80 as shown in FIG. 4B. In other words, as illustrated in FIG. 4A, first through fourth images are respectively displayed in the first through fourth regions 82 through 85. Thus, when the user inputs the signal in the display state of FIG. 4A, the display image processing apparatus may change the second image displayed in the second region 83 into a fifth image as shown in FIG. 4B. The fifth image may correspond to a fifth image file which is numerically out of sequence with the image files corresponding to the images displayed on the display after the second image displayed in the second region 83 is changed into the fifth image. For example, the fifth image displayed in the second region 83 may have been photographed at a different time or out of sequence with the first, third, and fourth images displayed in the first region 82, third region 84, and fourth region 85, respectively.

When the conventional digital image processing apparatus displays a plurality of images, e.g., first through fourth images, on the display, in order to change the plurality of images into other images, the conventional digital image processing apparatus changes the first through fourth images into fifth through eighth images. Thus, the conventional digital image processing apparatus cannot simultaneously display three images of the first through fourth images and the fifth image on the display. As a result, the conventional digital image processing apparatus cannot help a user to directly compare the three images of the first through fourth images with the fifth image. However, the digital image processing apparatus of the present embodiment may simultaneously display three images of first through fourth images and a fifth image on a display in order to maximize the user's convenience.

It has been described with reference to FIGS. 4A and 4B that the second image displayed in the second region 83 is changed into the fifth image. However, an image displayed in another one of the first through fourth regions 82 through 85 may be changed. Also, a sixth image may be displayed in the second region 83 according to the signal input from the user when the fifth image is displayed in the second region 83 as shown in FIG. 4B. Alternatively, the sixth image may be displayed in another region.

The digital image processing apparatus of FIG. 1 may include up, down, left, and right buttons, and the user may operate these buttons in order to select one of a plurality of regions of a display region in which an image is to be changed into another image. In this case, the digital image processing apparatus of FIG. 1 may display a currently selected region of the plurality of regions of the display region on the display.

The display may include a touch screen having a touch screen function, and a touch of the user on the display may be regarded as a signal of the user as described above. In other words, when the user touches the second region 83 when the first through fourth images in the first through fourth regions 82 through 85 of the display 80 are displayed as shown in FIG. 4A, the second image displayed in the second region 83 may be changed into the fifth image as shown in FIG. 4B.

When a plurality of images are displayed on the display 80 as shown in FIG. 4B, an image displayed in one of the first through fourth 82 through 85 of the display 80 may be displayed throughout the display region of the display 80 according to a signal input from the user as shown in FIG. 4C. If the display 80 has a touch screen function, and the user touches the fourth region 85 in the display state of FIG. 4, the image displayed in the fourth region 85 of the first through fourth regions 82 through 85 of the display 80, to which the touch point corresponds, may be displayed throughout the display region of the display 80 as shown in FIG. 4C. As a result, the user's convenience may be maximized.

It has been described in the present embodiment that the digital image processing apparatus of FIG. 1 divides a display region of a display into a plurality of regions and respectively displays images in the plurality of regions in order to simultaneously display images corresponding to image files stored on a storage medium on the display, and varies a size of one of the plurality of regions. However, this description is not limiting.

In other words, a digital image processing apparatus according to another embodiment may include a storage medium which stores image files and a display which displays images corresponding to the image files stored on the storage medium. The digital image processing apparatus may divide a display region of the display 80 into a plurality of regions 82, 83, 84, and 85 and respectively display images in the plurality of regions 82, 83, 84, and 85 as shown in FIG. 4A in order to simultaneously display the images corresponding to the image files stored on the storage medium on the display 80. When the digital image processing apparatus respectively displays the images in the plurality of regions, the digital image processing apparatus may also display an image corresponding to another image file stored on the storage medium, which is not among the image files corresponding to the images displayed on the display, in one of the plurality of regions of the display region according to a signal input from a user. For example, the digital image processing apparatus may change the image displayed in the second region 83 into an image corresponding to another image file stored on the storage medium as shown in FIG. 4B. As a result, the user may conveniently compare a plurality of images. If the display 80 includes a touch screen having a touch screen function, the signal input from the user may include a touch of the user, and the one region may be one of the plurality of regions of the display to which the touch point corresponds. In other words, if the user touches the second region 83 in the display state of FIG. 4A, the digital image processing apparatus may change the image displayed in the second region 83 as shown in FIG. 4B.

A digital image processing apparatus according to another embodiment of the present invention may include a storage medium which stores image files and a display which displays images corresponding to the image files stored on the storage medium and includes a touch screen having a touch screen function. The digital image processing apparatus may divide a display region of the display 80 into a plurality of regions 82, 83, 84, and 85 and respectively display the images in the plurality of regions 82, 83, 84, and 85 as shown in FIG. 4B in order to simultaneously display the images corresponding to the plurality of image files stored on the storage medium on the display 80. When the digital image processing apparatus displays the plurality of images on the display 80, the digital image processing apparatus may display an image displayed in one of the regions 82, 83, 84, and 85 of the display 80 to which a touch point corresponds, throughout the display region of the display 80. As a result, a user's convenience may be maximized. For example, if the fourth region 85 is selected in the display state of FIG. 4B, the digital image processing apparatus may display an image displayed in the fourth region 85 throughout the display region of the display 80 as shown in FIG. 4C. In this case, the selection of the fourth region 85 may be by a touch of a user on the fourth region 85.

A program for executing a method of displaying and comparing images using the digital image processing apparatus according to the aforementioned embodiments or modifications thereof in the digital image processing apparatus may be stored in a computer-readable storage medium. The storage medium may include the storage medium 70, as illustrated in FIG. 1. Examples of the storage medium include magnetic storage media (e.g., floppy disks or hard disks), optical recording media (e.g., CD-ROMs or digital versatile disks (DVDs)), and electronic storage media (e.g., integrated circuits (IC's), ROM, RAM, or flash memory).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. A digital image processing apparatus comprising:
a storage medium which stores image files; and
a display comprising a touch screen which displays images corresponding to the image files stored on the storage medium,
wherein a display region of the display is divided into a plurality of regions and a plurality of images corresponding to a plurality of image files stored on the storage medium are respectively displayed in the plurality of regions such that the plurality of images are displayed simultaneously and in response to a touch on the touch screen, a size of at least one of the plurality of regions varies differently from a size of another one of the plurality of regions.

2. The digital image processing apparatus of claim 1, wherein the size of at least one of the plurality of regions of the display is variable in response to a touch point dragged on the touch screen.

3. The digital image processing apparatus of claim 1, wherein when the plurality of images are displayed on the display, another image corresponding to another image file stored on the storage medium is displayed in one of the plurality of regions according to a signal input from a user.

4. The digital image processing apparatus of claim 3, wherein the signal input from the user includes a touch of the user on the touch screen at a point corresponding to the one of the plurality of regions of the display.

5. The digital image processing apparatus of claim 3, wherein the another image file is out of sequence with the plurality of image files corresponding to the plurality of images.

6. The digital image processing apparatus of claim 1, wherein when the plurality of images are displayed on the display, an image displayed in one of the plurality of regions of the display is displayed throughout the display region of the display according to a signal input from a user.

7. The digital image processing apparatus of claim 1, wherein when the plurality of images are displayed on the display, an image displayed in one of the plurality of regions of the display corresponding to a point at which a user inputs a touch on the touch screen is displayed throughout the display region of the display.

8. The digital image processing apparatus of claim 7, wherein when the plurality of images are displayed on the display and consecutive touches of a user are input at a point on the touch screen, an image displayed in one of the plurality of regions to which the touch point corresponds is displayed throughout the display region of the display.

9. A digital image processing apparatus comprising:
a storage medium which stores image files; and
a display comprising a touch screen which displays images corresponding to the image files stored on the storage medium,
wherein a display region of the display is divided into a plurality of regions and a plurality of images corresponding to a plurality of image files stored on the storage medium are respectively displayed in the plurality of regions such that the plurality of images are displayed simultaneously on the display and in response to a touch on the touch screen, a size of at least one of the plurality of regions varies differently from a size of another one of the plurality of regions, and another image corresponding to another image file stored on the storage medium is displayed in one of the plurality of regions of the display according to a signal input from a user.

10. The digital image processing apparatus of claim 9, wherein the signal input from the user includes a touch of the user at a point of the touch screen corresponding to the one of the plurality of regions of the display.

11. The digital image processing apparatus of claim 9, wherein the another image file is out of sequence with the plurality of image files corresponding to the plurality of images.

12. A digital image processing apparatus comprising:
a storage medium which stores image files; and
a display having a touch screen which displays images corresponding to the image files stored on the storage medium,
wherein a display region of the display is divided into a plurality of regions and a plurality of images corresponding to a plurality of image files stored on the storage medium are respectively displayed in the plurality of regions such that the plurality of images are displayed simultaneously and in response to a touch on the touch screen, a size of at least one of the plurality of regions varies differently from a size of another one of the plurality of regions, and an image displayed in one of the plurality of regions corresponding to a point at which a user inputs a touch on the touch screen is displayed throughout the display region of the display.

13. The digital image processing apparatus of claim 12, wherein when the plurality of images are displayed on the display and consecutive touches are input from a user at a point, an image displayed in one of the plurality of regions of the display to which the touch point corresponds is displayed throughout the display region of the display.

14. A method for displaying a plurality of images on a digital image processing apparatus, the method comprising:
displaying an image corresponding to an image file stored on a storage medium throughout a display region of a display;
dividing the display region of the display into a plurality of regions;
displaying a plurality of images corresponding to a plurality of image files stored on the storage medium in the plurality of regions respectively; and
varying a size of at least one of the plurality of regions differently from a size of another one of the plurality of regions.

15. The method of claim 14, wherein varying the size of the at least one of the plurality of regions comprises interpreting a touch input from a user on a touch screen of the display.

16. The method of claim 14, wherein varying the size of the at least one of the plurality of regions is in proportion to a drag of a touch point input from a user on a touch screen of the display.

17. The method of claim 14, further comprising displaying another image corresponding to another image file stored on the storage medium in one of the plurality of regions according to a signal input from a user.

18. The method of claim 17, wherein the another image file is out of sequence with the plurality of image files corresponding to the plurality of images.

19. The method of claim 14, further comprising displaying one of the plurality of images displayed in the plurality of regions throughout the display region of the display according to a signal input from a user.

20. The method of claim 19, wherein the input from the user comprises consecutive touches input from the user on a touch screen of the display at touch points which correspond to the one of the plurality of images.

21. A method for displaying a plurality of images on a digital image processing apparatus, the method comprising:
displaying a first image on a display region of a display; and
displaying the first image on a first region of the display region and a second image on a second region of the display region in response to an input touch-drag signal,
wherein sizes of the first image and the second image are adjusted by a length of drag included in the input touch-drag signal.

* * * * *